US006416070B1

(12) United States Patent
Lin

(10) Patent No.: US 6,416,070 B1
(45) Date of Patent: Jul. 9, 2002

(54) MULTI-FUNCTIONAL WHEEL CHAIR

(75) Inventor: Shih-Chiang Lin, Taipei (TW)

(73) Assignee: Fu Burg Industrial Co., Ltd., Taipei (TW)

( * ) Notice: Subject to any disclaimer, the term of this patent is extended or adjusted under 35 U.S.C. 154(b) by 0 days.

(21) Appl. No.: 09/708,527

(22) Filed: Nov. 9, 2000

(51) Int. Cl.[7] .................................................. B62M 63/02

(52) U.S. Cl. ................ 280/250.1; 280/47.4; 280/304.1; 297/467

(58) Field of Search ........................... 280/250.1, 304.1, 280/255, 657, 47.371, 47.4, 47.38; 297/467, 411.36, 411.38, 411.41; 403/92, 93, 95, 104, 107, 83

(56) References Cited

U.S. PATENT DOCUMENTS

| | | | | |
|---|---|---|---|---|
| 3,216,738 A | * | 11/1965 | Bockus | 297/467 |
| 3,226,160 A | * | 12/1965 | Page | 297/DIG. 4 |
| 4,617,919 A | * | 10/1986 | Suhre | 280/250.1 |
| 5,320,416 A | * | 6/1994 | Kornberg | 297/467 |
| 5,378,041 A | * | 1/1995 | Lee | 280/250.1 |
| 5,568,933 A | * | 10/1996 | Mizuno | 280/250.1 |
| 5,573,261 A | * | 11/1996 | Miller | 280/250.1 |
| 5,577,753 A | * | 11/1996 | Pociask | 280/250.1 |
| 5,586,343 A | * | 12/1996 | Mayle | 280/304.1 |
| 5,915,712 A | * | 6/1999 | Stephenson et al. | 280/304.1 |
| 6,073,951 A | * | 6/2000 | Jindra et al. | 280/304.1 |
| 6,123,306 A | * | 9/2000 | Jackson | 280/304.1 |
| 6,209,901 B1 | * | 4/2001 | Patel | 280/304.1 |
| 6,286,904 B1 | * | 9/2001 | Obertelli et al. | 297/DIG. 4 |

FOREIGN PATENT DOCUMENTS

| | | | | |
|---|---|---|---|---|
| JP | 5220194 | * | 10/1991 | 280/250.1 |
| JP | 5253260 | * | 3/1992 | 280/250.1 |
| JP | 6121813 | * | 10/1992 | 280/250.1 |
| JP | 6154269 | * | 11/1995 | 280/304.1 |

* cited by examiner

*Primary Examiner*—Lanna Mai
*Assistant Examiner*—Hau Phan
(74) *Attorney, Agent, or Firm*—Rosenberg, Klein & Lee

(57) ABSTRACT

A multi-functional wheel chair comprises a chair seat, a chair leg, two hand supporters, and a back rod. The chair seat includes a chair seat body, and a front side of the chair seat body is formed with an opening. The chair frame is installed below the chair seat and includes a plurality of chair legs, and a lower end of each chair leg is installed with a front wheel and a rear wheel. Two hand supporters each includes a supporter body. A rear side of the supporter body is installed with a handle. Each of the hand supporters is connected to a left and a right side of the chair seat through a first joint device. A back rod includes a rod body. The rod body is connected to a rod frame; the rod frame is connected to the chair frame through a second joint device. The user may be adhered to the rod body of the back rod for cleaning the back. Furthermore, the wheel chair can be moved to be near a commode for cleaning and going to stool. Moreover, excreta collector, shower nozzle frame, and drip frame can be installed in the present invention and is adjusted.

3 Claims, 11 Drawing Sheets

MULTI-FUNCTIONAL WHEEL CHAIR

FIELD OF THE INVENTION

The present invention relates to a multi-functional wheel chair, and especially to a wheel chair, which is installed with a back rod, so that a user may adhere on the rod body of the back rod for cleaning the back. Furthermore, the wheel chair can be moved to be near a commode for cleaning and going to stool. Moreover, excreta collector, shower nozzle frame, and drip frame can be installed in the present invention and is adjusted.

BACKGROUND OF THE INVENTION

In general, wheel chairs are convenient for patients or those inconvenient in moving. Therefore, it is important to these persons and thus manufactures of wheel chairs made many developments to improve the functions of wheel chairs. However, the prior art wheel chairs used commercially have still many disadvantages. For example, it is inconvenient in washing back, head and going to stool, and the hand supporters and back supporters are fixed and thus are lack of function of adjustment.

Therefore, there is eager demand for a novel wheel chair which may improve the abovesaid defects.

SUMMARY OF THE INVENTION

Accordingly, the primary object of the present invention is to provide multi-functional wheel chair, in which a front side of the chair seat is installed with a back rod. The user may be adhered to the rod body of the back rod for cleaning the back.

Another object of the present invention is to provide a multi-functional wheel chair, wherein the support body can rotate through 360 degrees around the pivotal element as a fulcrum for adjustment so as to clean the left side and right side of the user conveniently.

A further object of the present invention is to provide a multi-functional wheel chair, wherein the wheel chair can be moved to be near a commode for cleaning and going to stool.

An yet object of the present invention is to provide a multi-functional wheel chair, wherein a plurality of draining holes are formed near an edge of the chair seat body so that water on the top of the chair seat body can be drained out from the draining holes and thus water is not accumulated on the top of the chair seat body.

A still object of the present invention is to provide a multi-functional wheel chair, wherein a shower nozzle frame is installed for hanging the shower nozzle for cleaning. A movable shower nozzle water box can be used. One side of the chair seat body is firmly secured with a sleeve for being inserted by a drip frame for hanging with a drip bottle.

A still object of the present invention is to provide a multi-functional wheel chair, wherein each of a left and a right side of the opening is installed with a sliding track at a bottom of the chair seat, and an excreta collector is inserted from a rear side of the sliding tracks for cleaning and going to stool conveniently.

A still object of the present invention is to provide a multi-functional wheel chair, wherein a movable head washing frame may be installed on the two hand supporters and the handle for being pushed to a washing basin for washing head.

A last object of the present invention is to provide a multi-functional wheel chair, wherein each of the front chair legs is installed with a pedal for placing the leg of the user. Another end of the connecting rod covers on the front chair legs by a cover so that the pedals may turn upwards or downwards through 90 degrees or leftwards and rightwards through 90 degrees.

The various objects and advantages of the present invention will be more readily understood from the following detailed description when reading in conjunction with the appended drawing.

DETAILED DESCRIPTION OF THE PREFERRED EMBODIMENTS

Figure 1:
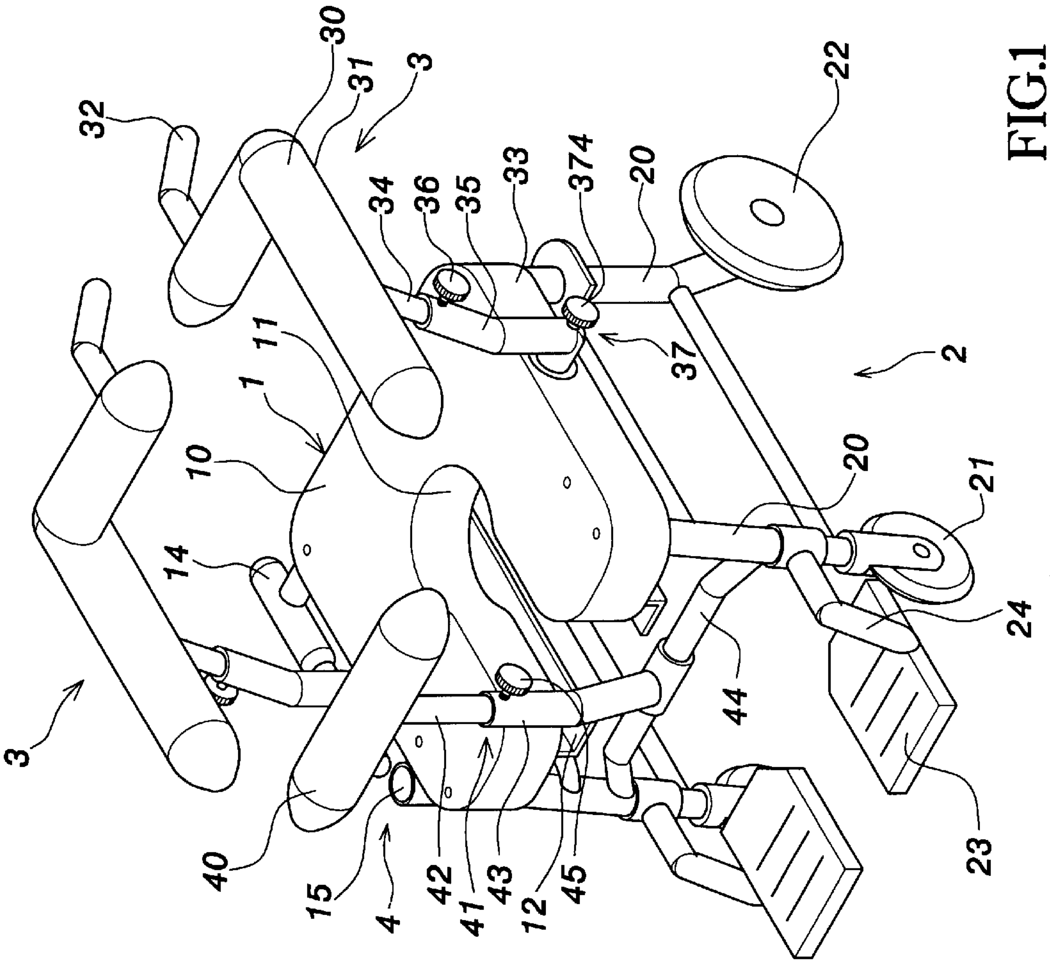
FIG. 1 is an assembled perspective view of the present invention.
Figure 2:
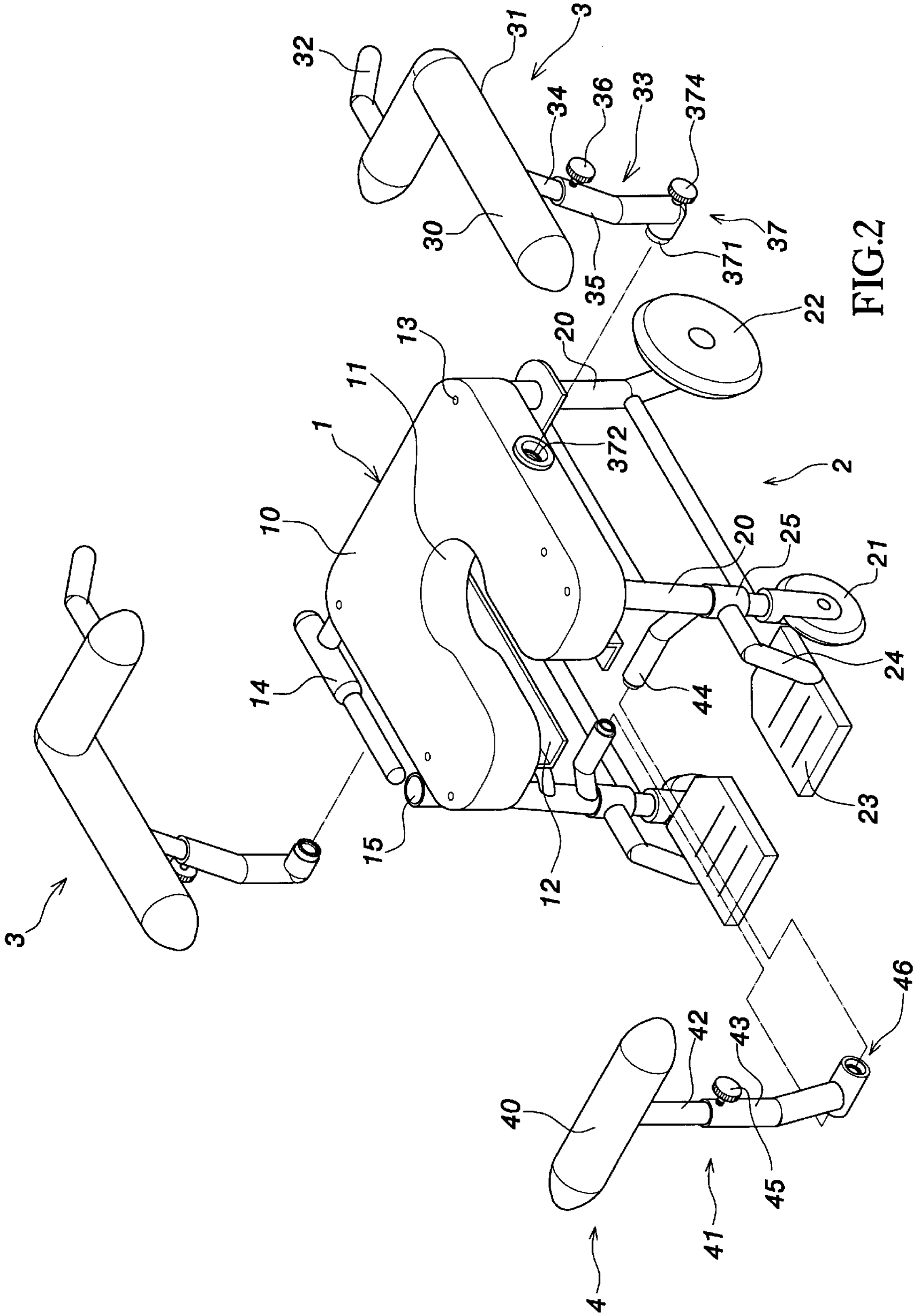
FIG. 2 is an exploded perspective view of the present invention.
Figure 5:
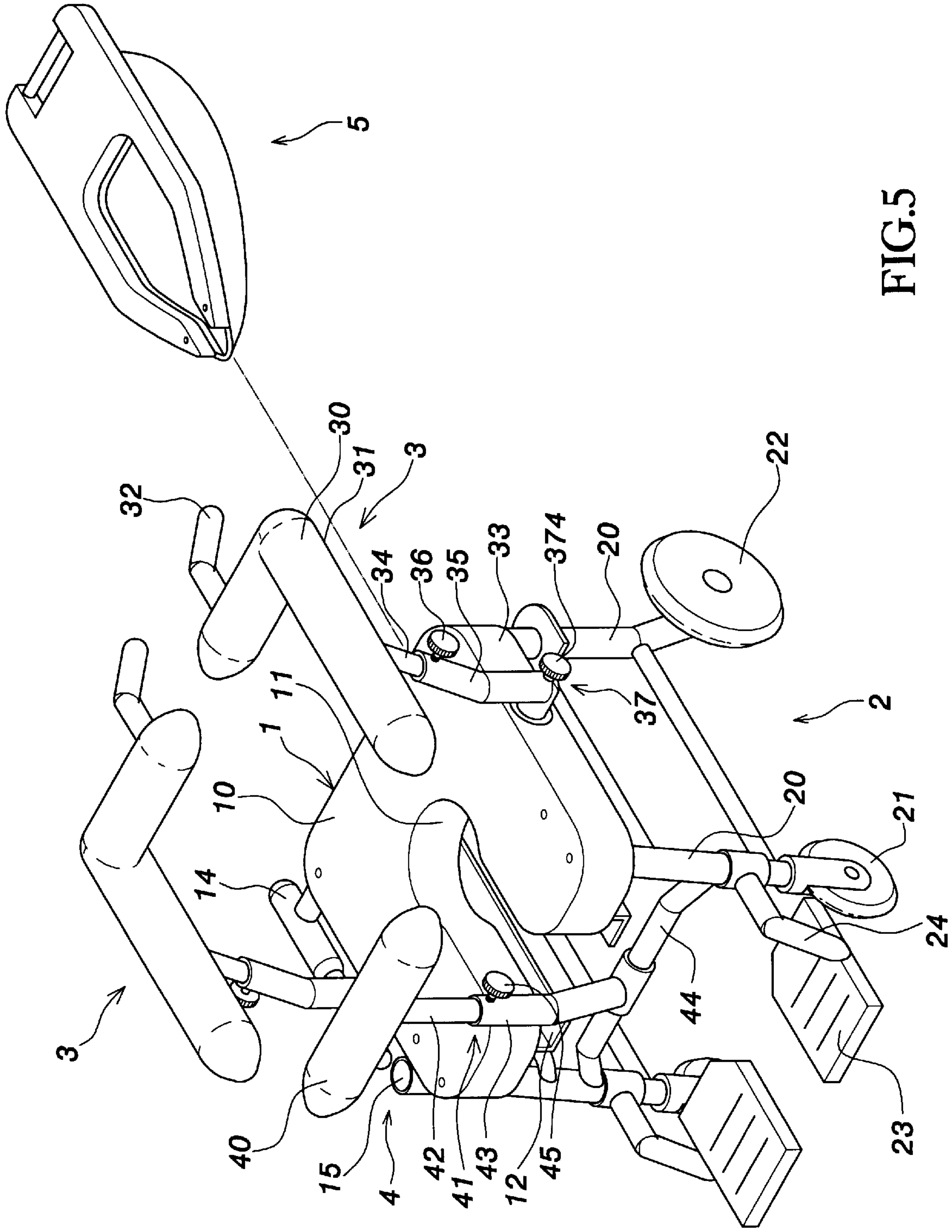
FIG. 5 is a schematic view (1) showing the condition of the present invention.
Figure 6:
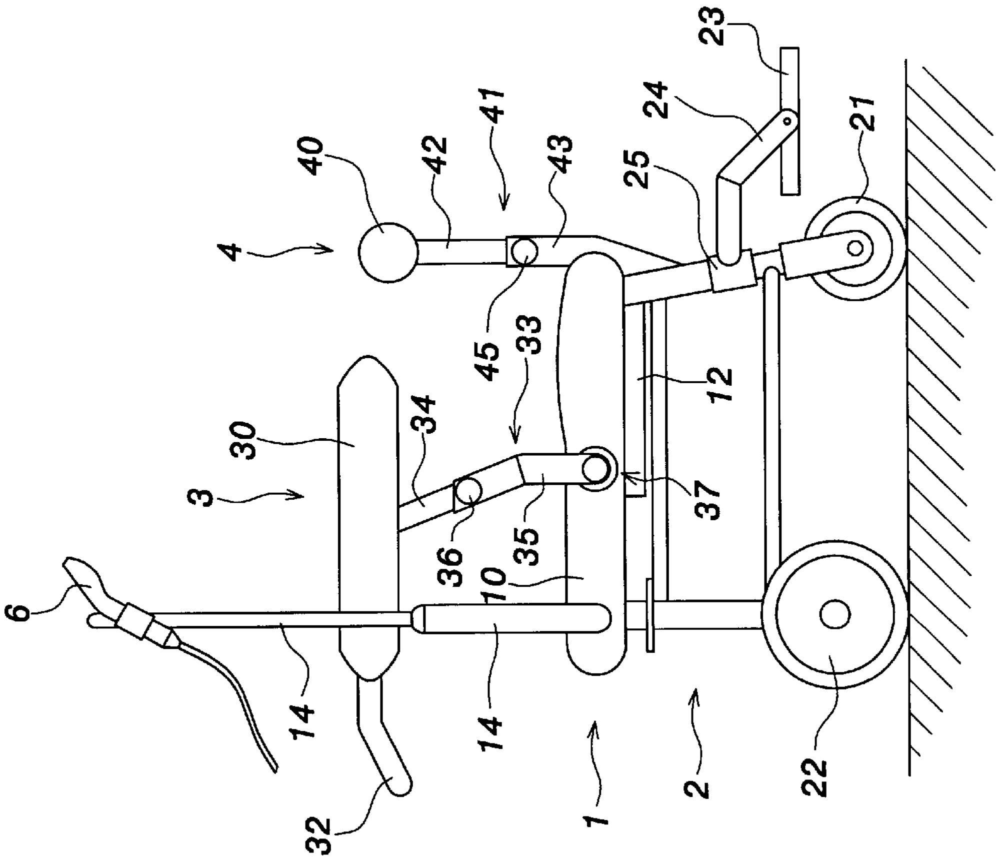
FIG. 6 is a schematic view (2) showing the condition of the present invention.
Figure 7:
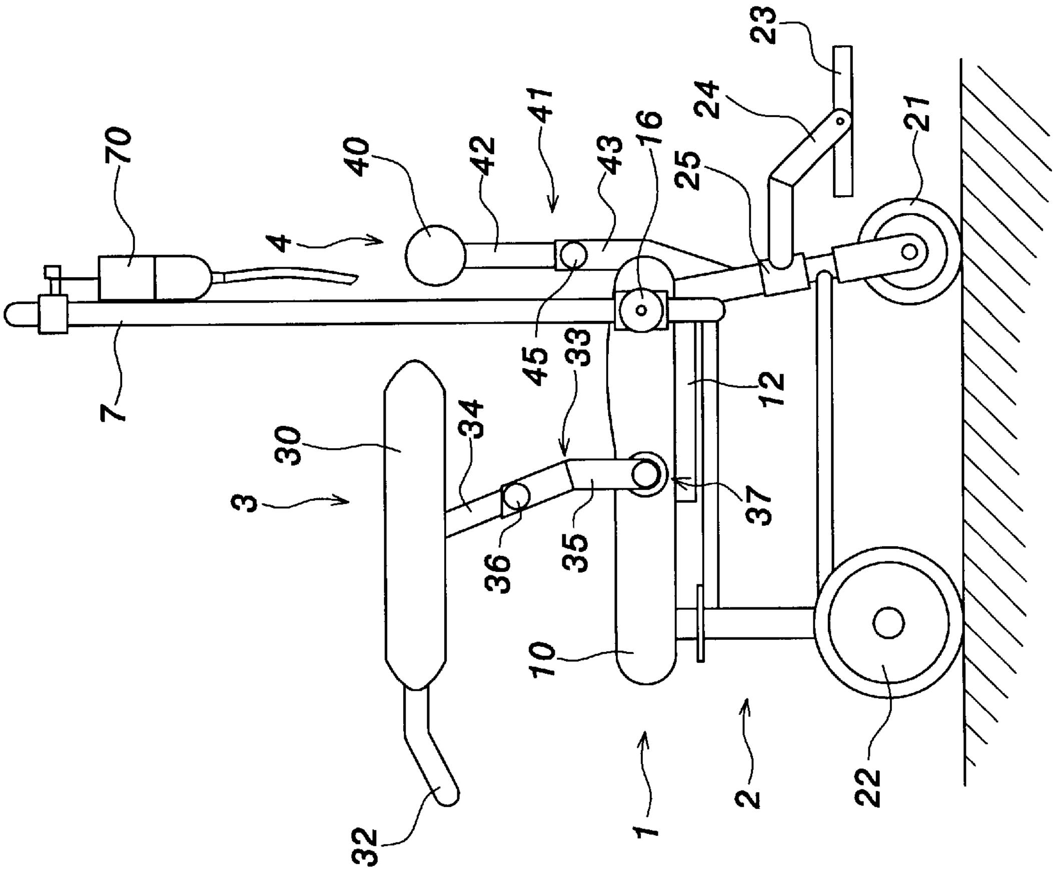
FIG. 7 is a schematic view (3) showing the condition of the present invention.

Referring to FIGS. 1 and 2, the assembled perspective view and exploded perspective view of the preferred embodiment about the multi-functional wheel chair of the present invention are illustrated. The multi-functional wheel chair according to the present invention includes a chair seat 1, a chair frame 2, two hand supports 3, and a back rod 4. The chair seat 1 has a chair seat body 10 which has an approximate concave shape, and a front side thereof is formed with an opening 11. The opening extended backwards to a proper distance. The bottom of the chair seat body 10 is installed with sliding tracks 12 at a left and a right side of the opening 11 so that an excreta collector can be inserted from a rear side (see FIG. 5). A plurality of draining holes 13 are formed near an edge of the chair seat body 10 so that water on the top of the chair seat body 10 can be drained out from the draining holes 13 and thus water is not accumulated on the top of the chair seat body 10. One side of the chair seat body 10 is pivotally installed with a shower nozzle frame 14. As the shower nozzle frame 14 does not been used, it can be place horizontally, while as it is used then it is upright or placed vertically (see FIG. 6) so as to be pushed aside of the shower nozzle 6 for hanging the shower nozzle 6 for cleaning. A movable shower nozzle water box can be used. One side of the chair seat body 10 is firmly secured with a sleeve 15 for being inserted by a drip frame 7 (see FIG. 7) for hanging with a drip bottle 70. The drip bottle can be adjusted upwards or downwards and then is locked by a fixing button 45 screwedly connected to sleeve 15.

The chair frame 2 is made of metal tubes and is installed below the chair seat 1. The chair frame 2 includes four chair legs 20. An upper end of each leg 20 is properly connected to a bottom of the chair seat 1. The lower end of each of two chair legs 20 is pivotally installed with a front wheel 21, while the lower end of each of two chair legs 20 is pivotally installed with a rear wheel 22. By the rolling of the front wheels 21 and the rear wheel 22, the wheel chair may move convenient, moreover, the front wheel 21 may rotate for rotating the wheel chair. Each of the front chair legs 20 is installed with a pedal 23 for placing the leg of the user. The pedal 23 is pivotally installed to a connecting rod 24. Another end of the connecting rod 24 covers on the front chair legs 20 by a cover 25 so that the pedals 23 may turn upwards or downwards through 90 degrees or leftwards and rightwards through 90 degrees.

Figure 8:
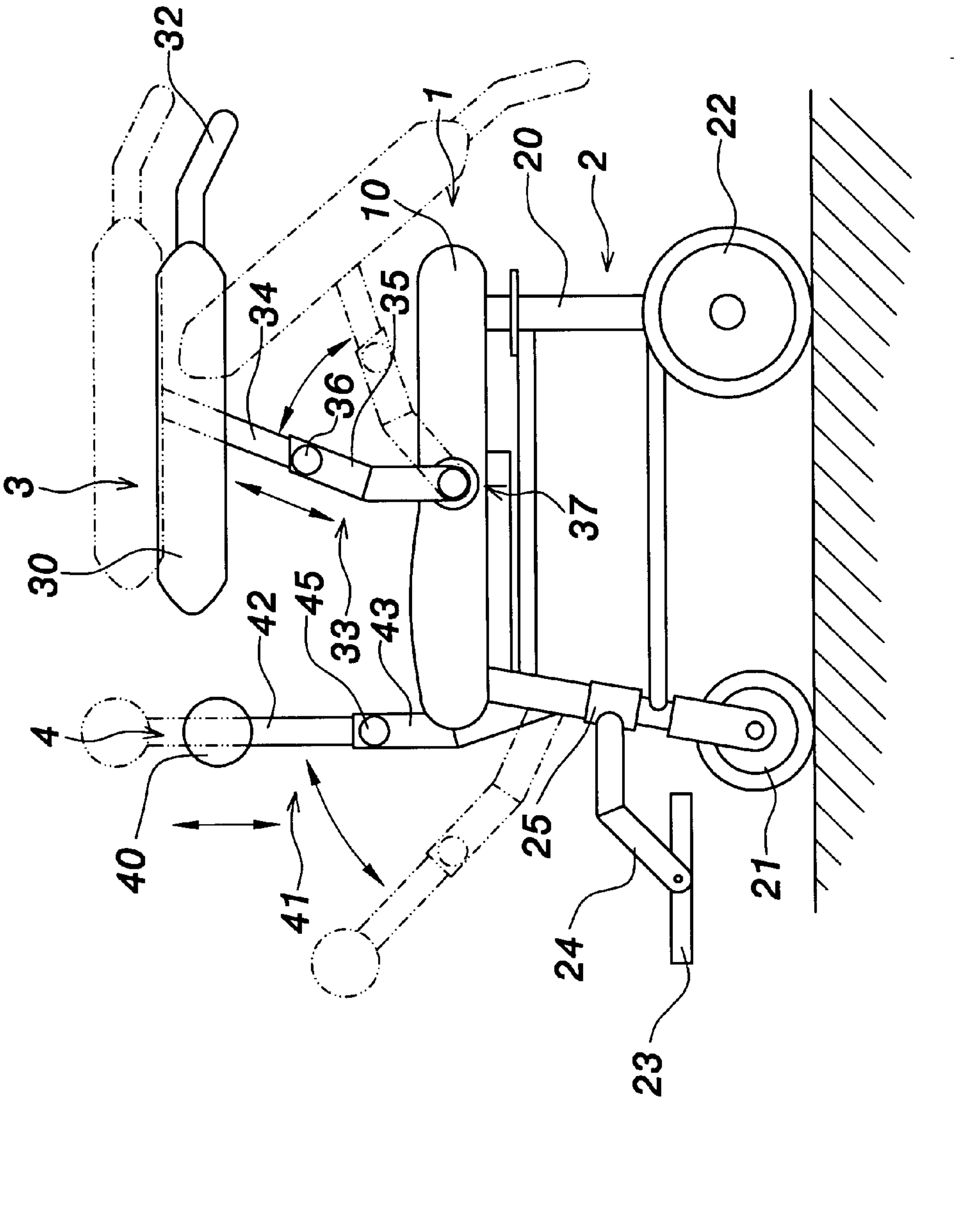
FIG. 8 is a schematic view (4) showing the condition of the present invention.

The hand supports 3 are placed at the left and right sides of the chair seat 1. Each of the hand support 3 has a support body 30 having an approximate L shape, which has the functions of supporting the hands and backs of the user. The surface of the hand supports is enclosed d by soft sponge 31. The support body 30 has a rear side installed with a handle 32 for pushing the wheel chair. The bottom of the support body 30 is connected to a support frame 33. The support frame 33 is telescopic and is formed by engaging an inner tube 34 with an outer tube 35. The support body 30 is connected to an upper end of the inner tube 34. The lower end of the outer tube 35 is connected to the left and right sides of the chair seat 1. The inner tube 34 and outer tube 35 are telescopically for adjusting the length so that the support body 30 can be adjusted upwards or downwards (see FIG. 8), and then a fixing button 36 screwedly connected to an upper end of the outer tube 35 serves to lock it.

Figure 3:
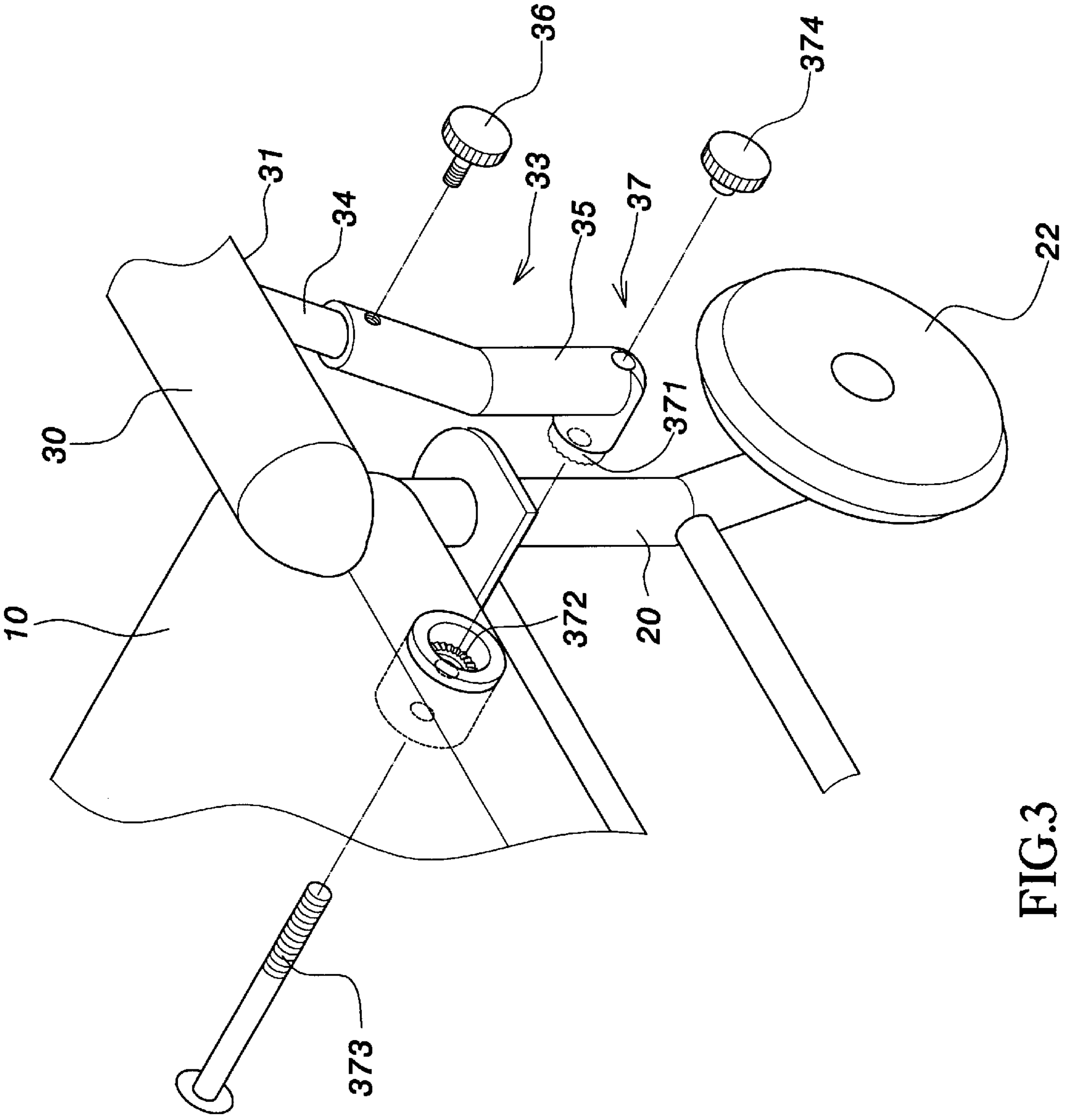
FIG. 3 is an exploded perspective view of the chair seat and hand supporters of the present invention.

A lower end of the support frame 33 is connected to the left and right sides of the chair seat 1 through a first joint device 37 (see FIG. 3). The joint device 37 includes second ratchets 371 at a lower end of the support frame 33 and second ratchets 372 at the left and right sides of the chair seat 1. The first ratchet 371 and second ratchet 372 are engageable and a pivotal element serves to pivotally connect the first ratchet 371 with the second ratchet 372, and then is screwedly to a fixing button 374. The support body 30 can rotate through 360 degrees around the fulcrum of the pivotal element 373 for adjustment (see FIG. 8). By the engagement of the ratchets 371 and 372, the object of a multi-stage positioning and adjustment is achieved. After adjusting, by tightly screwing the fixing button 374, the orientation of the support body 30 can be fixed. The left and right hand supports 3 can be adjusted in orientation and longitudinally so as to clean the left side and right side of the user conveniently.

The back rod 4 is installed at a front side of the chair seat 1, and includes a rod body 40 which is a horizontal body. The bottom of the rod body 40 is connected to supporting frame 41. The supporting frame 41 is telescopic and is formed by an inner tube 42 and an outer tube 43. The back rod body 40 is connected to an upper end of the inner tube 42. The lower end of the outer tube 43 is connected to a transverse rod 44 installed at the front two chair legs 20. The inner tube 42 and the outer tube 43 may adjust the length telescopically so that the supporter body 40 are adjusted upwards or downwards (see FIG. 8). Then a fixing button 45 screwedly connected to an upper end of the outer tube 43 serves to lock it.

Figure 4:
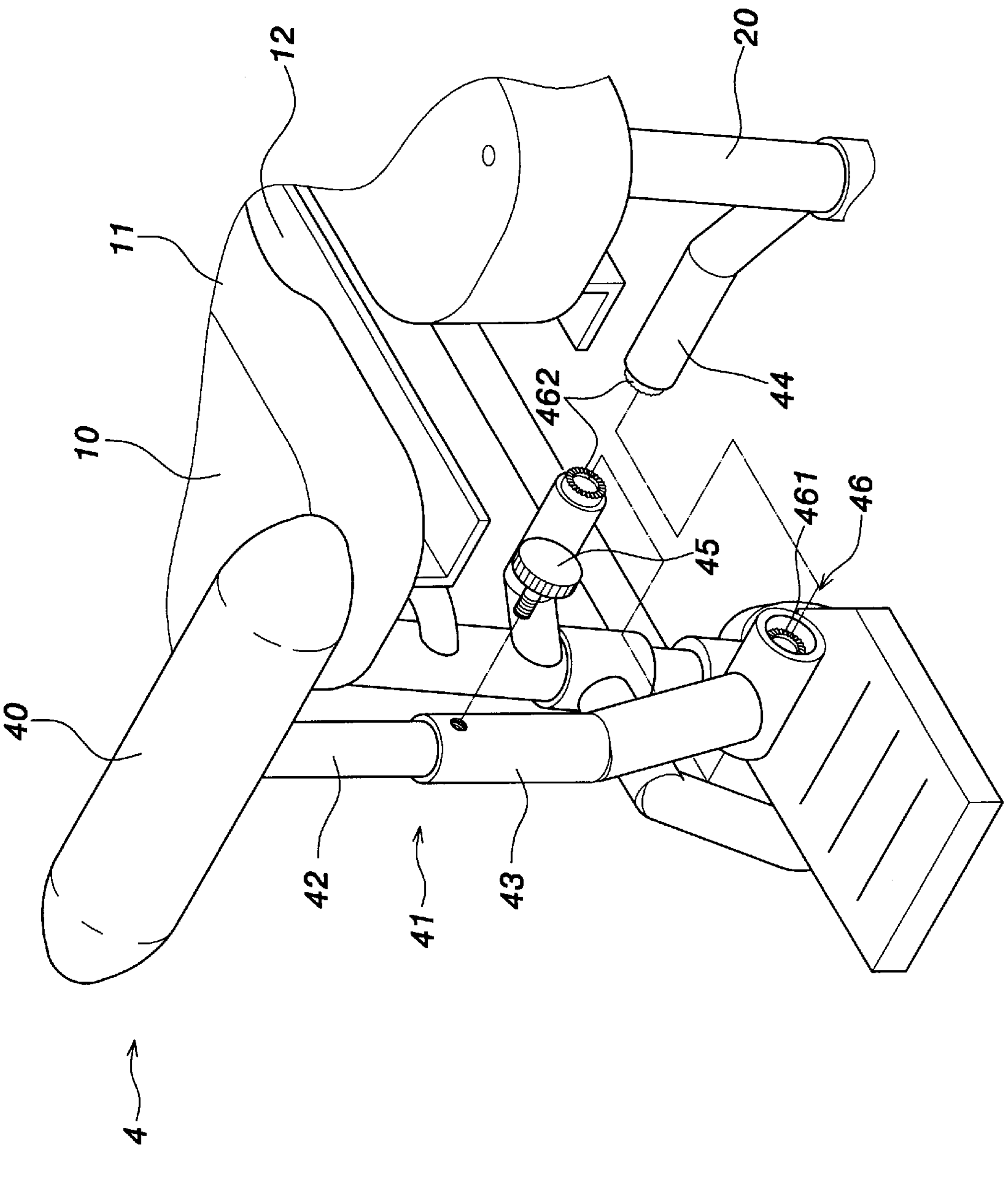
FIG. 4 is an exploded perspective view of the chair seat and back rod of the present invention.

The lower end of the supporting frame 41 is connected to the transverse rod 44 of the front two chair legs 20 by a second joint device 46 (see FIG. 4). The joint device 46 has two third ratchets 461 installed at the lower end of the supporting frame 41 and two fourth ratchets 462 installed at the transverse rod 44. The two ratchets 461 and 462 are engaged with one another so that the rod body 40 may be adjusted upwards or downwards (see FIG. 8). Therefore, an effect of multiple stage adjustment is achieved.

Figure 9:
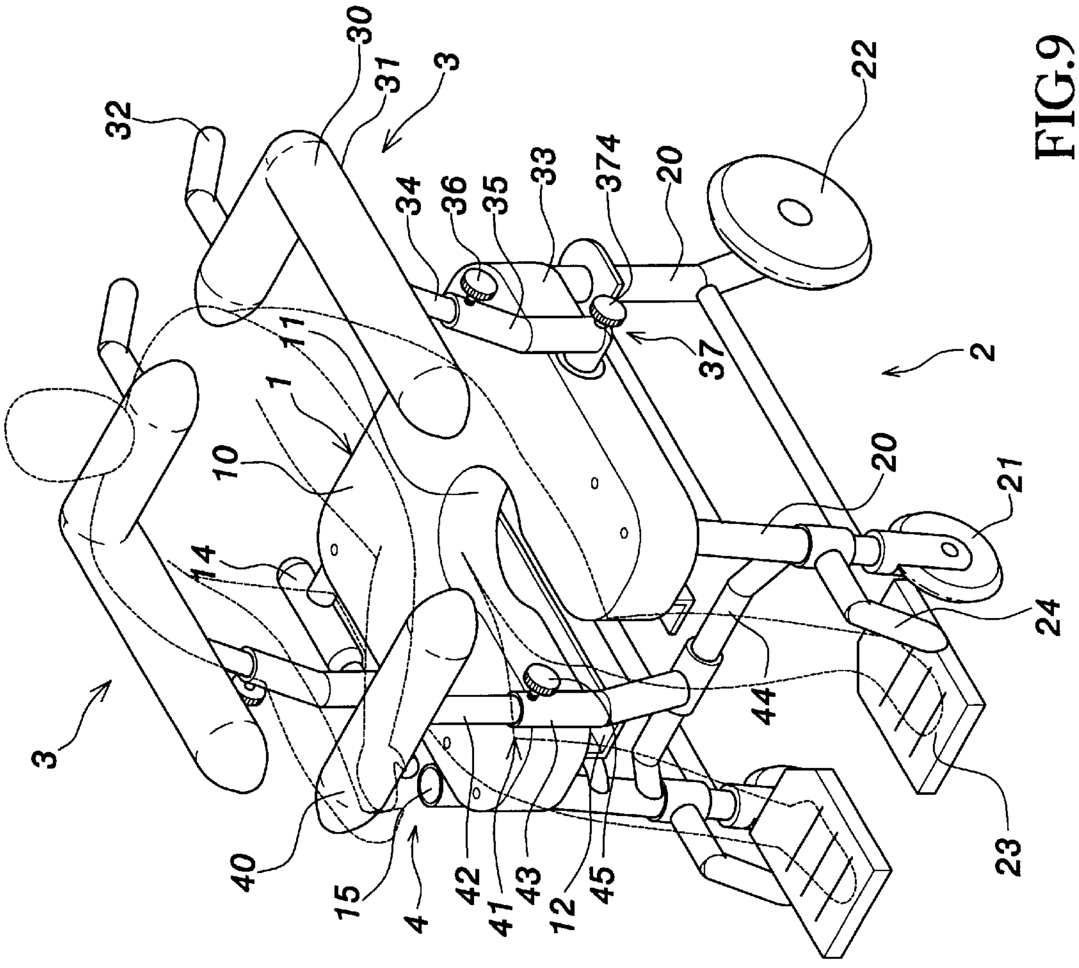
FIG. 9 is a schematic view (5) showing the condition of the present invention.
Figure 10:
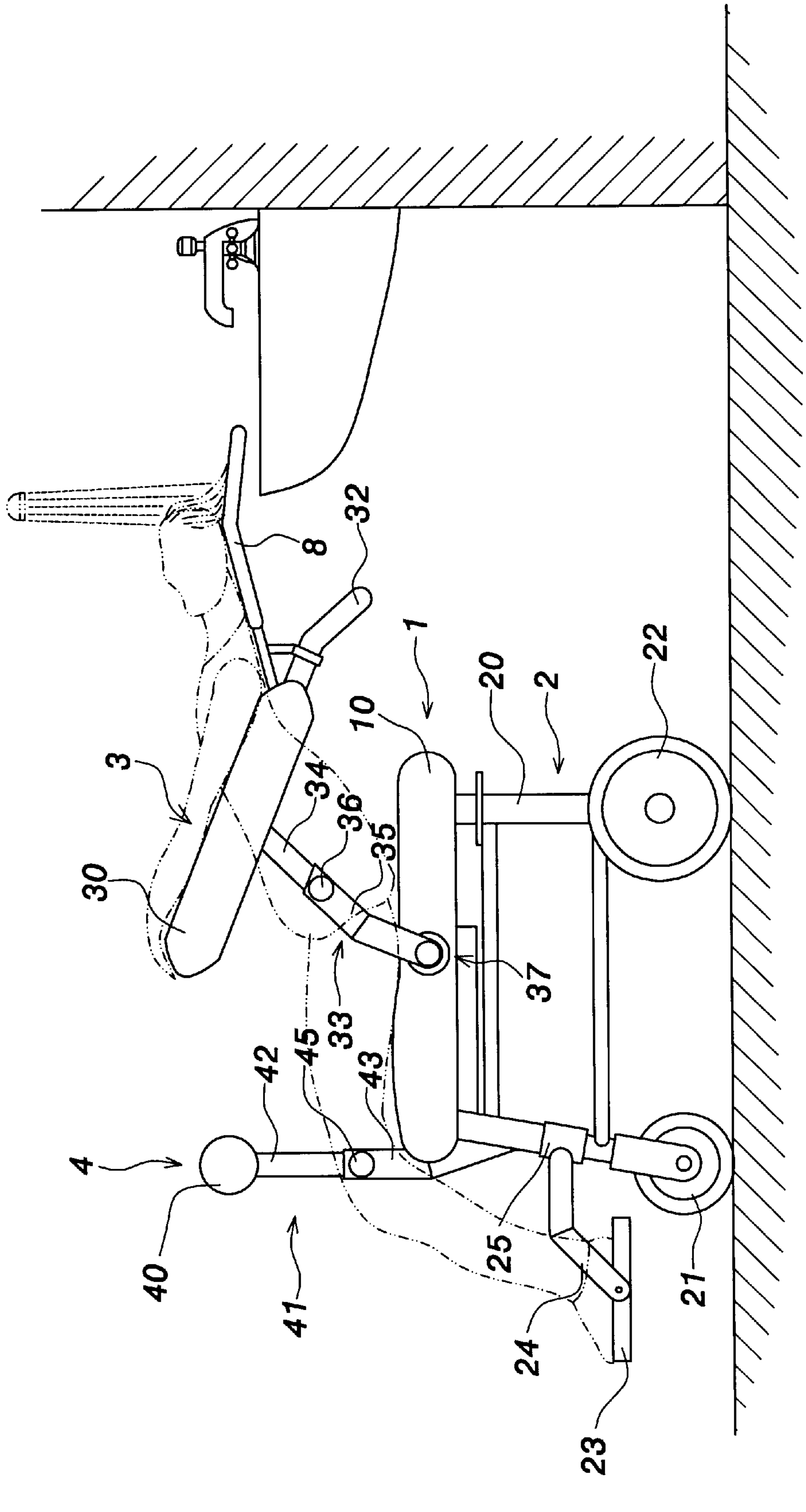
FIG. 10 is a schematic view (6) showing the condition of the present invention.
Figure 11:
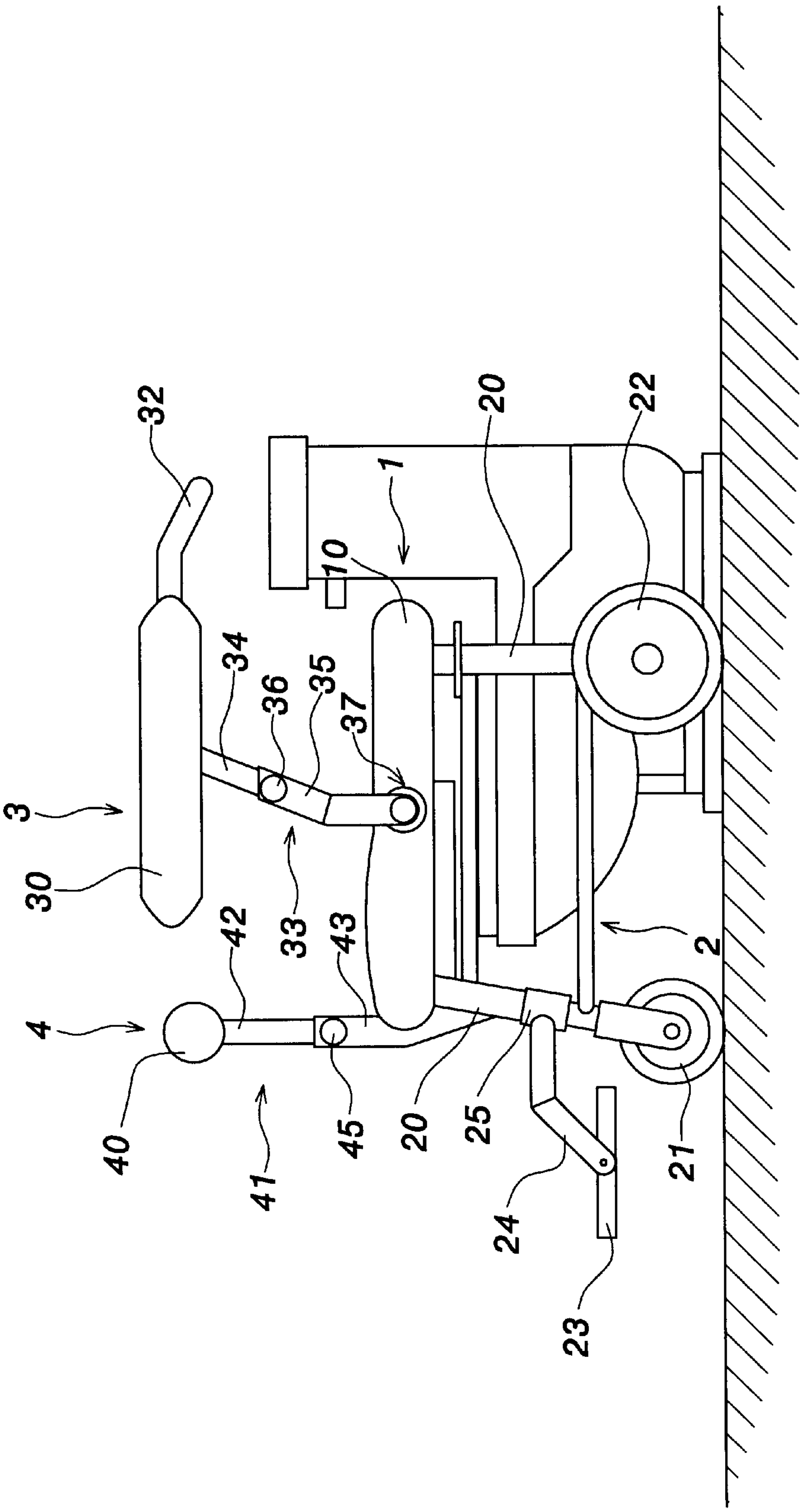
FIG. 11 is a schematic view (7) showing the condition of the present invention.

Referring to FIG. 9, in the present invention, a front side of the chair seat 1 is installed with a back rod 4. The user may be adhered to the rod body 40 of the back rod 4 for cleaning the back. Furthermore, referring to the FIG. 10, a movable head washing frame 8 may be installed on the two hand supporters 30 and the handle 32 for being pushed to a washing basin for washing head. Moreover, referring to FIG. 11, in the present invention, the wheel chair can be moved to be near a commode for cleaning and going to stool.

Therefore, in the defects of prior art, such as inconvenience of washing back, head and going to stool, the hand supporters and back supporters are fixed and adjustment, are improved by the present invention.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multi-functional wheel chair comprising:

a chair seat including a chair seat body, a front side of the chair seat body being formed with an opening formed therethrough;

a chair frame installed below the chair seat and including a plurality of chair legs, a front pair of the plurality of chair legs each having a lower end coupled to a front wheel and a rear pair of the plurality of chair legs each having a lower end coupled to a rear wheel;

two hand supports respectively coupled to opposing sides of the chair seat, each hand support including a support frame coupled to the chair seat and a support body coupled to the support frame, each support body having an L-shape to extend along a side and rear portion of the chair seat for forming a support for both a user's arm and back, the support body having a handle portion extending from a rear side thereof, each support frame including an outer tube coupled to a respective side of the chair seat by a first joint device for angularly adjusting an orientation of the support body and an inner tube having one end coupled to the support body and an opposing end telescopically and adjustably coupled to the outer tube; and a back rod including a rod body connected to a rod frame, the rod frame being connected to the chair frame through a second joint device adapted for incremental angular adjustment of the rod frame relative to the chair frame.

2. The multi-functional wheel chair as claimed in claim 1, further comprising a pair of connecting rods respectively pivotally coupled to the two front chair legs and a pair of pedals respectively pivotally coupled to the connecting rods, each of the pedals being pivotally displaceable through 90 degrees about an axis directed in a first direction, each of the connecting rods being pivotally displaceable through 90 degrees about an axis directed in a second direction, the second direction being substantially orthogonal to the first direction.

3. A multi-functional wheel chair comprising:

a chair seat including a chair seat body, a front side of the chair seat body being formed with an opening formed therethrough;

a chair frame installed below the chair seat and including a plurality of chair legs, a front pair of the plurality of chair legs each having a lower end coupled to a front wheel and a rear pair of the plurality of chair legs each having a lower end coupled to a rear wheel;

two hand supports respectively coupled to opposing sides of the chair seat, each hand support including a support frame coupled to the chair seat and a support body coupled to the support frame, each support body having an L-shape to extend along a side and rear portion of the chair seat for forming a support for both a user's arm and back, the support body having a handle portion extending from a rear side thereof; and a back rod including a rod body connected to a rod frame, the rod frame being connected between the front pair of chair legs by a joint device adapted for incremental angular adjustment of the rod frame relative to the chair frame, the rod frame being formed by an inner tube and an outer tube which are telescopically connected to one another, the rod body being connected at an upper end of the inner tube and a lower end of the outer tube connected to the joint device, the outer tube having a fixing button connected thereto for locking a position of the inner tube.

* * * * *